INVENTORS:
ROBERT C. GLOVER
WILHELM S. EVERETT
BY Elliott & Pastoriza
ATTORNEY

United States Patent Office 3,616,627
Patented Nov. 2, 1971

3,616,627
COMBINATION PULSATION DAMPENER AND FLUID SEPARATOR
Wilhelm S. Everett and Robert C. Glover, Santa Paula, Calif., assignors to American Air Filter Company, Inc.
Continuation of application Ser. No. 606,461, Dec. 30, 1966, which is a continuation of application Ser. No. 516,816, Nov. 5, 1965, which in turn is a continuation-in-part of application Ser. No. 210,683, July 18, 1962, all now abandoned. This application Apr. 1, 1968, Ser. No. 718,017
Int. Cl. B01d 45/06, 45/08
U.S. Cl. 55—274                                   3 Claims

ABSTRACT OF THE DISCLOSURE

A combination pulsation dampener and fluid separator is provided wherein particles of fluid entrained in a gaseous flow are separated out in the inlet chamber portion of the pulsation dampener. Towards this end the fluid and gas mixture inlet to the dampener terminates at a distance less than one diameter of the inlet pipe from a wall or partition portion of the inlet chamber. This wall or partition portion may be provided with protuberances against which the fluid impinges. The outlet from the inlet chamber to a further chamber in the pulsation dampener is disposed in a pipe so that reverse flow is necessary over a given distance during which time separation takes place. A suitable drain is disposed from the inlet chamber to collect the separated fluid or other particles.

---

This application is a continuation of applicant's application Ser. No. 606,461, filed Dec. 30, 1966, which application is a continuation of application Ser. No. 516,816, filed Nov. 5, 1965, which latter application is a continuation-in-part of applicant's application Ser. No. 210,683, filed July 18, 1962, of the same title as the present case, and all now abandoned.

This invention generally relates to devices for dampening pulsations and alleviating surges in fluid lines, and furthermore relates to devices for separating out liquid which may be entrained in gases or separating out solids from liquids. Thus, in instances in which the invention may be applied to liquids entrained in gases, the invention may be considered as relating to scrubbers or other devices similarly used to wash gases and separate liquid particles therefrom.

Throughout the specification and claims, the terms "scrubber" and "scrubbing" will be used in a broad sense synonomously with "separating out," "settling out" and equivalent expressions relating to the removal of foreign matter not desired in the fluid flowing through the device.

Various devices are well known in the art for washing or scrubbing gases and for separating out liquid therefrom. Thus, the prior art discloses gravity separation, static spray scrubbers, liquid-spray scrubbing, and disintegrators, and inertia separation. Moreover, the prior art discloses various types of pulsation dampeners or surge alleviators. Such pulsation dampeners find advantageous usage for eliminating or at least alleviating pulsations in fluid conveying systems which may embody reciprocating pumps, compressors, reciprocating engines, or equivalent apparatus. Reference may be had in this regard to W. S. Everett's issued Pat. No. 2,993,559, issued July 25, 1961, entitled Fluid Surge Alleviator.

The prior art, however, does not to applicants' knowledge disclose a unitary construction in which the functions of both a pulsation dampener and scrubber are combined. In the past, the pulsation dampener and scrubbing units have necessarily, because of the state of the art and the designs employed, comprised separate devices installed perhaps in series but otherwise separately in the fluid line.

One object, therefore, of the present invention is to provide a unitary or single device embodying both a pulsation dampener and a scrubber for installation in fluid conveying systems to perform the dual functions of alleviating pulsations and at the same time separating out heavier fluid particles.

Another object of the present invention is to provide a combination pulsation dampener and fluid scrubber in which certain structural components of the pulsation dampener, for example, are designed to perform a secondary function in scrubbing or washing the fluid passing therethrough.

Still another object of the present invention is to provide a combined pulsation dampener and scrubber which is relatively rugged in its construction and which will be characterized by a maintenance-free life of a greater order of magnitude than the fluid conveying system in which it is connected.

A still further object of the present invention is to provide a combined pulsation dampener and scrubber which has no moving parts, and which is of such a construction that it may be built at a considerably lesser cost than the cost that would be incurred in building two separate units.

These and other objects and advantages of the present invention are generally attained by providing a combination pulsation dampener and scrubber generally comprised of an elongated closed casing which has an inlet opening at one end and an outlet opening at the opposite end. A lateral partition or wall is disposed within the casing and in spaced relationship from the inlet opening. The partition defines with the inlet opening end of the casing an inlet chamber.

A first tubular member is connected with the inlet opening and extends into the inlet chamber a distance such that its distal end approaches a point proximate to the lateral partition. A second tubular member communicates from a point in the inlet chamber closer to the inlet opening than the distal end to another point on the other side of the partition.

With such a construction, fluid entering the inlet opening and through the first tubular member will first pass through the distal end thereof to impinge against the partition; thereafter, the fluid will reverse itself in direction and flow back into the mouth of the second tube to pass by means thereof through the partition.

It will be appreciated as a consequence of this action, that the impinging of the fluid against the partition as well as the reversal of the direction of its flow will effect an inertia type separation, whereby the fluid particles entrained in the gas will be separated out or in which heavier liquid particles in a lighter liquid will be separated out. The combination pulsation dampener and scrubber of the present invention, however, is believed to have primary application in connection with liquid particles that may be foreign to a gas fluid.

In a preferred embodiment, protuberations extend into the first chamber from the partition such that the fluid impinging against the protuberations will cause agglomeration of the liquid particles into larger droplets which will have a further tendency to separate out and fall to the bottom of the chamber. It is also desirable in this regard to provide a drain or other receptacle, sometimes referred to in the art as a "wet leg" whereby the fluid separated out may be collected.

A better understanding of the present invention will be had by reference to the drawings, showing merely illustrative embodiments, and in which.

Figure 1:
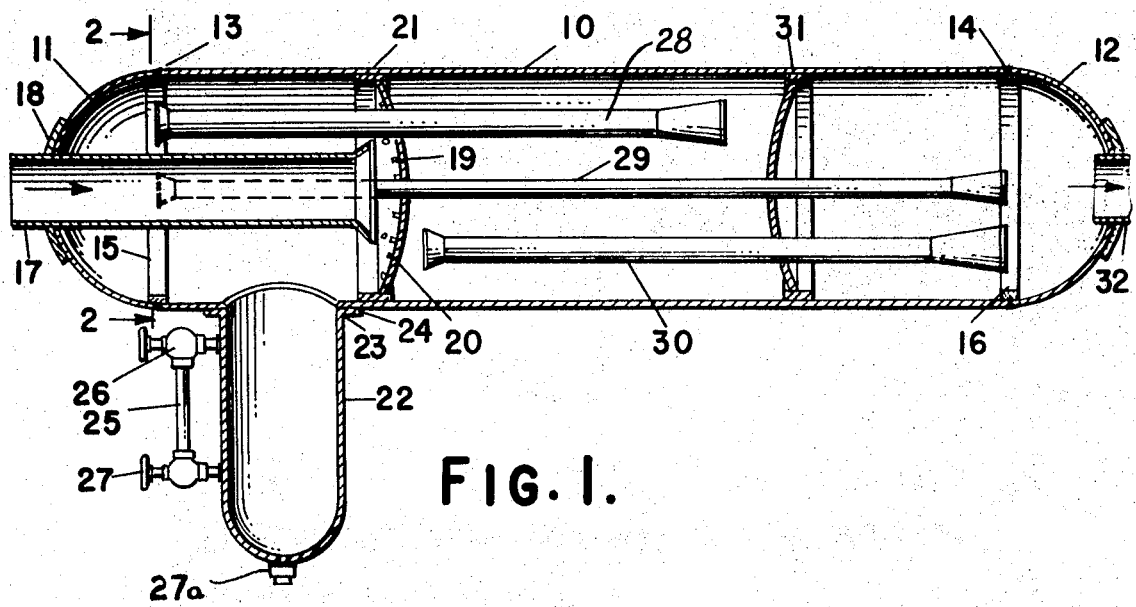
FIG. 1 is a sectional view of one embodiment of a combined pulsation dampener and scrubber according to the present invention.

Referring now to the drawings, there is shown in FIG. 1, a combination pulsation dampener and scrubber comprising an elongated cylindrical casing 10 provided with one end closure 11 and an opposite end closure 12. The end closure 11 may be welded at 13 to the casing 10; similarly, the end closure 12 is welded at 14 to the opposite end of the main casing body. Desirably, back-up rings or members 15 and 16 are provided within the casing at the weld points 13 and 14.

In accordance with a feature of the present invention, an inlet opening is provided in the end closure 11 which has communicating therewith an inlet tube or pipe 17. If desired, the end closure 11 may be reinforced at 18 for more rugged retention of the inlet pipe 17.

The inlet pipe 17 has its distal end positioned proximate a laterally extending wall or partition 19. It is desirable that this end be positioned at a point less than one-half the outer diameter of the tube 17; a maximum distance would equal the full outer diameter of the tube 17. Preferably, the wall 19 is of arcuate shape for greater structural strength. The wall 19 is provided with a plurality of protuberations 20 for a purpose to be hereafter explained. Again, it is desirable that a retaining ring 21 be positioned about the interior periphery of the casing at a point at which the lateral wall 19 is connected.

The wall 19, end closure 11, and inter-connecting portion of the casing 10 defines therein an inlet chamber which has communicating with the bottom thereof a liquid drain receptacle 22, which is sometimes referred to in the art as a "wet leg." The receptacle 22 is desirably connected so as to communicate with an opening 23 in the bottom of the inlet chamber disposed between the end closure 11 and wall 19 such that liquid may fall by gravity into the receptacle 22 through the opening 23 in the bottom of the chamber.

It is preferable that a gauge glass 25 be provided for indicating the quantity of fluid in the receptacle 22. Towards this end, valves 26 and 27 communicate with the gauge 25 and with the interior of the receptacle 22. Also, a drain plug 27a may be provided for releasing fluid from the receptacle 22.

Figure 2:
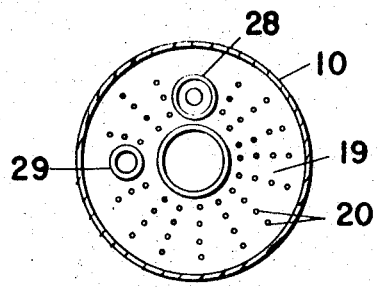
FIG. 2 is a cross-sectional view taken in the direction of the arrows 2—2 of FIG. 1, not including the fluid drain receptacle or "wet leg"; and, FIG. 3 is a longitudinal sectional view of another embodiment of the combined pulsation dampener and scrubber according to the present invention, dislosing only part of the fluid drain receptacle.

In the same manner as shown in applicants' Pat. No. 2,993,559 heretofore identified and as shown in FIG. 2, a tube 28 extends from the inlet chamber into an intermediate chamber within the casing 10. It is desirable that the tube 28 be positioned near the upper portion of the chamber. It is important to note that the tube 28 has its inlet end positioned at a point substantially closer to the end closure 11 than the distal end of the inlet tube 17. Similarly, another tube 29 extends from the same point as tube 28 except that the outlet end of the tube 29 is positioned at a point proximate the outlet end of the casing 10, that is, near the end closure 12. A still further tube 30 extends from the intermediate chamber to a point such that its outlet end is aligned with the outlet end of the tube 29. Both tubes 29 and 30 extend through a second partition or bulk head 31.

The second partition or bulk head 31 defines with the wall 19 and the inter-connecting portion of the casing 10 the intermediate chamber heretofore mentioned. Furthermore, the partition 31 defines with the end wall 12 and the inter-connecting portion of the casing 10 the final outlet chamber. The orientation of the tubes 28, 29, and 30, and the formation of the intermediate and outlet chambers are clearly described in applicants' Pat. No. 2,993,559 and are thus well known in the art. In consequence, they form no part of the present invention except in the combination set forth. It should also be noted that for purposes of clarity in describing the present invention, no mention has been made of the mechanical supports which may be provided as shown in Pat. No. 2,993,559 for rigidly holding the tubes 28, 29, and 30 in position. These tubes perform the same functions as set forth in Pat. No. 2,993,559.

The operation of the combination pulsation dampener and scrubber, according to the present invention, may now be described.

The device may be employed, for example, in connection with a compressor whereby the unit has its outlet 32 connected to the inlet of a compressor unit. Assuming a gaseous fluid, the gas will enter through the inlet pipe 17 and out the distal end thereof to impinge against the wall 19 and the protuberations 20 projecting therefrom. In consequence, any liquid particles entrained in the gas will tend to separate out and fall by gravity into the drain receptacle 22. Moreover, the gas must necessarily reverse itself and flow back towards the end closure 11 before again reversing itself to flow into the tubes 29 and 28. The reversing action effected by the wall 19 as well as the further reversing action because of the points of location of the inlet ends to tubes 28 and 29 will effect a further separation of the heavier liquid particles that may be mixed in the gas entering in the inlet pipe 17.

In other words, the impinging of the gas upon the wall 19 and protuberations 20 effects a partial separation of the liquid particles and the reversal of direction of flow before the fluid enters pipes 28 and 29 effects an even further separation of liquid particles. It should be noted that it is possible to also employ a thick screen mesh to achieve the same effect as the protuberations 20, that is, the agglomeration of smaller particles of liquid into heavier droplets. The actual dampening of the pulsations will occur as the gas flows through the tubes 28, 29 and 30 in the same manner as described in conjunction with Pat. No. 2,993,559. It will be seen, however, that the wall 19 not only performs its function towards the end of pulsation dampening as set forth in Pat. No. 2,993,559, but further in combination with the inlet tube 17 effects a scrubbing action on fluid passing through the unit. Similarly, the tubes 28 and 29 because of their inlet end locations cooperate to effect reversal of the gas flow which further aids in the scrubbing action while at the same time functioning satisfactorily for the pulsation dampening purposes.

Figure 3:
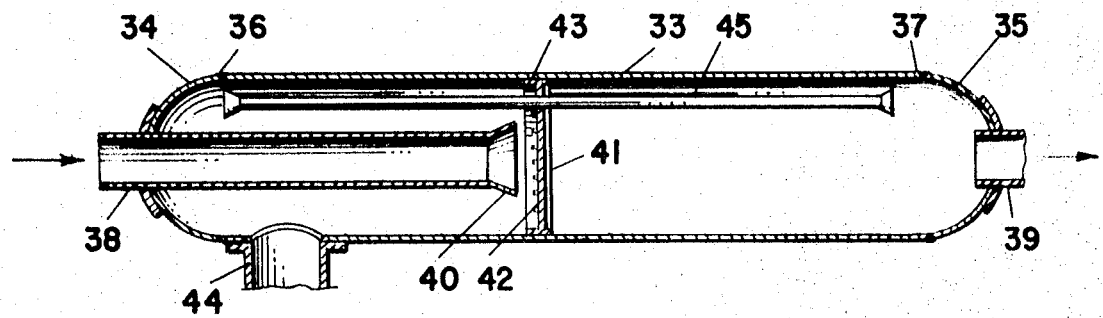

In the embodiment of FIG. 3, a somewhat less effective pulsation dampening unit is embodied in the combined apparatus. In other words, in the structure of FIG. 3, although the scrubbing portion of the device is equally as effective as in the construction of FIG. 1, the pulsation dampening system is somewhat less sophisticated although satisfactory in certain applications where less appreciable alleviation of surges is required.

In the combination pulsation dampener and scrubber shown in FIG. 3, there is provided a casing 33 formed with end closures 34 and 35. As in the construction of FIG. 1, the end closure 34 is welded at 36 to the casing, and similarly, the end closure 35 is welded at 37. The end closure 34 is provided with an inlet 38 and the end closure 35 with an outlet 39.

The inlet pipe 38 is provided so as to conduct fluid such that it will pass out a flared end 40 and impinge against a laterally extending wall or partition 41. The wall 41 may be provided with protuberations 42 in the same manner as the wall 19 of FIG. 2 is provided with protuberations 20. Desirably, a reinforcing ring 43 is positioned around the inner periphery of the casing 33 at the point at which the wall 41 is located.

The combination pulsation dampener and scrubber of FIG. 3 is similarly provided with a liquid outlet or drain receptacle 44 which may be constructed similarly to the receptacle 22 shown in FIG. 1.

Instead of providing a plurality of pipes and chambers as shown in FIG. 1, in the construction of FIG. 3, only a single tubular member 45 is provided which passes through the wall 41 to inter-connect with the inlet chamber on the left side thereof and with the outlet chamber on the right side thereof. The location of such a tube 45 will tend to dampen certain pulsation frequencies because of the reversal of fluid movement and the forcing of the fluid through the smaller diameter tube 45 before it is allowed to pass through the outlet 39. Also, it will be appreciated that the scrubbing action will be effected in the same manner as described in conjunction with FIG. 1.

From the foregoing, it will be seen that applicants have provided in a single unit a novel structure which performs the functions of pulsation dampening as well as scrubbing of fluid. The dual function is achieved with a substantial elimination of parts normally required for two separate units and by having certain of the parts employed perform dual functions. It is also evident that the unit does not have any moving parts, may be manufactured very economically, and may be constructed to have a long maintenance-free life.

Although the combined scrubbing and pulsation dampener apparatus may be used in other configurations, it most preferably is adapted to horizontal use in which gravity is most effective.

Although certain variations may be made in the precise structure and in the components used therein without departing from the spirit and scope of the invention, it is deemed that such variations and modifications will fall within the scope of the claims as set forth hereinafter.

We claim:

1. A combination pulsation dampener and scrubber for dampening fluid pulsations generated by reciprocating pumps, compressors and equivalent apparatus and separating out heavier fluid particles entrained in the fluid, comprising: a casing having an inlet opening and an outlet opening; a lateral partition within said casing in peripheral sealing engagement with the inner wall surface of said casing and spaced from the inlet opening to define an inlet chamber; a first imperforate tubular member of given diameter connected to said inlet opening and having its distal end extending into said inlet chamber to a point no further away from an interior surface portion of said chamber than the dimension of said given diameter, said interior portion being of arcuate shape in cross section with its concave surface portion including a plurality of protuberances facing said distal end; a second tubular member passing through said partition with its exterior in sealing relation with said partition, one end of said second tubular member being positioned in said inlet chamber at a point horizontally spaced from said interior surface portion of said chamber by a distance sufficient to permit separation of larger particles by gravity, and its other end opening out on the other side of said partition at a point beyond said partition greater than said given diameter; and a fluid drain means communicating with a bottom portion of said inlet chamber, whereby fluid entering said first tubular member will all first pass out said distal end to impinge against said interior surface portion of said inlet chamber and thereafter flow freely in a reverse horizontal direction towards said one end of said second tubular member, and again change direction, at least some of said fluid then flowing into said one end of said second tubular member and out its other end on the other side of said partition, whereby heavier particles that may be separated from said fluid as a consequence of gravity acting on said particles during traversing of the horizontal distance between said distal end and said one end of said second tubular member, and the presence of pulsations in said pulsation dampener, are collected in said fluid drain means.

2. A combination pulsation dampener and scrubber comprising: an elongated horizontally disposed cylindrical casing having end closures defining an inlet opening at one end and an outlet opening at the opposite end; a first lateral partition of arcuate shape in cross section and in peripheral sealing engagement with the inner surface of said casing with its concave surface portion spaced from and facing said one end to define an inlet chamber, said concave surface portion including a plurality of protuberances positioned in radially extending paths and projecting into said inlet chamber; a second lateral partition of arcuate shape in cross section and in peripheral sealing engagement with the inner surface of said casing with its concave surface portion spaced from and facing said opposite end to define an outlet chamber, said first and second partitions defining therebetween an intermediate chamber; a first imperforate tubular member of given diameter connected to said inlet opening in coaxial relationship to said casing and having its distal end extending into said inlet chamber to a point no further away from said first lateral partition than the dimension of said given diameter; a second tubular member in spaced parallel relationship to said first tubular member passing through said first lateral partition with its exterior in sealing relation with said partition, one end of said second tubular member being positioned in said inlet chamber at a point intermediate said inlet opening and said distal end of said first imperforate tubular member, and its other end opening out in said intermediate chamber at a point closer to said second lateral partition than to said first lateral partition so as to be spaced from said first lateral partition by a distance substantially greater than said given diameter; a third tubular member in spaced parallel relationship to said second tubular member passing through both said first and second lateral partitions with its periphery in sealing engagement with each partition to provide a direct fluid passage between said inlet and outlet chambers; a fourth tubular member in spaced parallel relationship with said third tubular member passing through said second lateral partition with its periphery in sealing engagement with said second lateral partition and with one end positioned in said intermediate chamber between said other end of said second tubular member and said first lateral partition and its other end opening out in said outlet chamber; and a fluid drain comprising a receptacle connected to the exterior lower portion of said inlet chamber and communicating with the interior through an opening in the bottom of said inlet chamber for collecting separated fluid, said receptacle including a bottom drain plug, whereby fluid entering said first imperforate tubular member will all pass out said distal end to impinge against the concave surface and protuberances of said first lateral partition and thereafter flow freely in a reverse horizontal direction toward said one end of said second tubular member and hence again change direction, at least some of said fluid then flowing into said one end of said second tubular member and out its other end into said intermediate chamber, and whereby heavier particles that may be separated from said fluid as a consequence of the scrubbing action effected by said first lateral partition and changes in flow direction are collected in said receptacle.

3. The subject matter of claim 2, including: a vertical glass level gauge communicating at its upper and lower ends with the upper and lower interior portions of said receptacle to indicate the level of fluid in said receptacle.

References Cited

UNITED STATES PATENTS

| | | | |
|---|---|---|---|
| 594,350 | 11/1897 | Jennings | 55—274 |
| 606,190 | 6/1898 | Corey | 55—274 X |
| 672,531 | 4/1901 | Hunter | 55—464 X |
| 734,878 | 7/1903 | Jamison | 181—53 |
| 1,292,450 | 1/1919 | Fisher | 55—464 |
| 1,463,990 | 8/1923 | Wilson | 55—274 X |
| 1,514,441 | 11/1924 | Culp | 181—53 X |
| 2,196,491 | 4/1940 | Chipley | 181—53 X |
| 2,600,262 | 6/1952 | Powers | 181—53 X |
| 2,642,954 | 6/1953 | Le Valley | 55—319 |
| 2,659,450 | 11/1953 | Baird | 181—53 X |
| 2,994,666 | 8/1961 | Hinds, Jr. | 252—417 |
| 2,973,065 | 2/1961 | Sillers, Jr. | 55—274 X |
| 2,993,559 | 7/1961 | Everett | 181—53 X |

FOREIGN PATENTS

| | | | |
|---|---|---|---|
| 1,018,878 | 10/1952 | France | 181—53 |
| 1,025,903 | 1/1953 | France | 181—53 |
| 1,033,807 | 4/1953 | France | 55—441 |
| 289,805 | 7/1953 | Switzerland | 181—53 |

DENNIS E. TALBERT, JR., Primary Examiner

U.S. Cl. X.R.

55—276, 319, 433, 441, 464, 465, 467; 181—53